United States Patent [19]
Kamata et al.

[11] Patent Number: 4,953,136
[45] Date of Patent: Aug. 28, 1990

[54] DOWNHOLE SEISMIC EXPLORATION DEVICE AND APPARATUS

[75] Inventors: Masahiro Kamata, Tokyo; Shitomi Katayama, Kanagawaken, both of Japan; Francis Mons, Bonnelles, France; Robert Porter, Bellevue, Wash.

[73] Assignee: Schlumberger Technology Corporation, New York, N.Y.

[21] Appl. No.: 887,307

[22] Filed: Jul. 18, 1986

[30] Foreign Application Priority Data

Jul. 24, 1985 [JP] Japan .................................. 60-161793

[51] Int. Cl.⁵ .............................................. G01V 1/00
[52] U.S. Cl. ...................................... 367/25; 181/102; 181/401; 367/911; 367/912; 335/288; 335/290
[58] Field of Search ..................................... 367/25-35, 367/911, 912; 181/102-106, 108, 112, 401; 73/151, 152; 324/323, 366, 368; 166/248, 250, 254; 175/40, 50; 335/288, 290

[56] References Cited

U.S. PATENT DOCUMENTS

| | | | |
|---|---|---|---|
| 2,191,121 | 2/1940 | Slichter | 367/25 X |
| 2,483,770 | 10/1949 | Hildebrandt | 181/401 X |
| 2,530,309 | 11/1950 | Martin | 324/221 X |
| 2,868,311 | 1/1959 | Tullos | 367/912 X |
| 2,959,241 | 11/1960 | Kokesh | 367/33 X |
| 3,208,549 | 9/1965 | Alexander et al. | 367/25 |
| 3,437,171 | 4/1969 | Davis et al. | 367/157 |
| 3,564,914 | 2/1971 | Desai et al. | 73/152 |
| 3,978,939 | 9/1976 | Trouiller | 181/104 |
| 4,219,773 | 8/1980 | Markfelt | 324/67 X |
| 4,329,673 | 5/1982 | Uchikune et al. | 335/288 |
| 4,633,248 | 12/1986 | Small | 367/25 X |
| 4,686,653 | 8/1987 | Staron et al. | 367/25 |
| 4,811,817 | 3/1989 | Staron et al. | 181/108 |

FOREIGN PATENT DOCUMENTS

| | | | |
|---|---|---|---|
| 0136027 | 8/1984 | European Pat. Off. | |
| 7233578 | 9/1972 | France | |
| 8407837 | 5/1984 | France | |
| 448415 | 11/1974 | U.S.S.R. | 324/368 |
| 526837 | 10/1976 | U.S.S.R. | 181/102 |
| 1080098 | 3/1984 | U.S.S.R. | 367/911 |

OTHER PUBLICATIONS

Philip W. Martin, "Magnetic Device Measures Stress on Pipe in Wells", The Petroleum Engr., Apr. 1949.

Primary Examiner—Brian S. Steinberger
Attorney, Agent, or Firm—Peter Y. Lee

[57] ABSTRACT

A downhole seismic exploration device comprises a seismic detector such as a geophone and a magnetic clamp, supported by Q-rings in an open cradle carrier which can be secured to a cable linking several such devices into an array. The array is lowered into a cased borehole and the magnetic clamps are operated to clamp the devices temporarily to the casing. Seismic signals detected by the geophones are transmitted to the surface via the cable, the O-ring supports acting to reduce or eliminate transmission of vibrations from the borehole fluid and the cable via the carrier to the geophone. The array is then unclamped and moved to another location in the borehole and the operation repeated. The magnetic clamp comprises a rotatable permanent magnet with radial poles disposed between a pair of parallel pole piece plates protruding on each side of the device and separated by non-magnetic blocks on each side of the magnet. When the magnet poles are aligned parallel to the pole piece plates the magnetic flux extends along closed paths entirely within the pole pieces and there is no clamping action. When the magnet is rotated 90° by a small motor the magnetic flux extends along the pole pieces and out of the device, clamping the device by magnetic attraction to the casing. A piezo bimorph element can be operated to vibrate the device to test the quality of the clamping before the acquisition of seismic data.

13 Claims, 11 Drawing Sheets

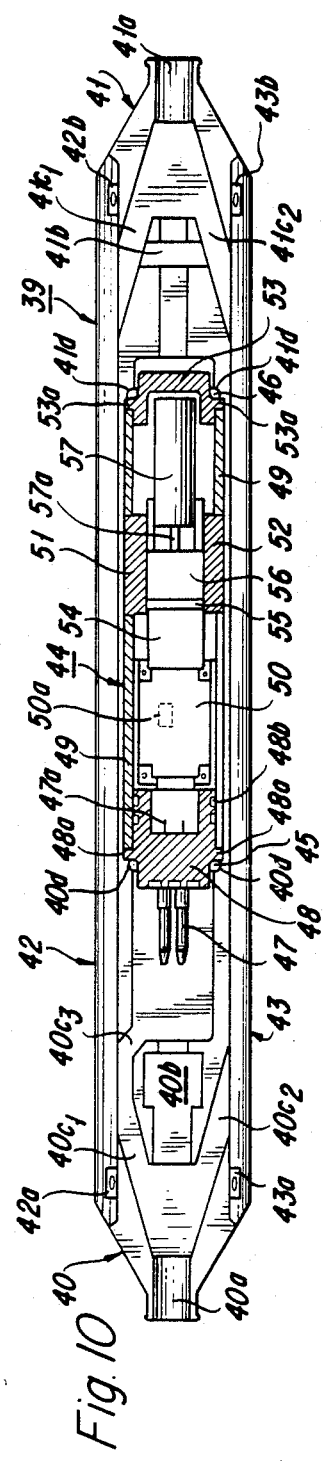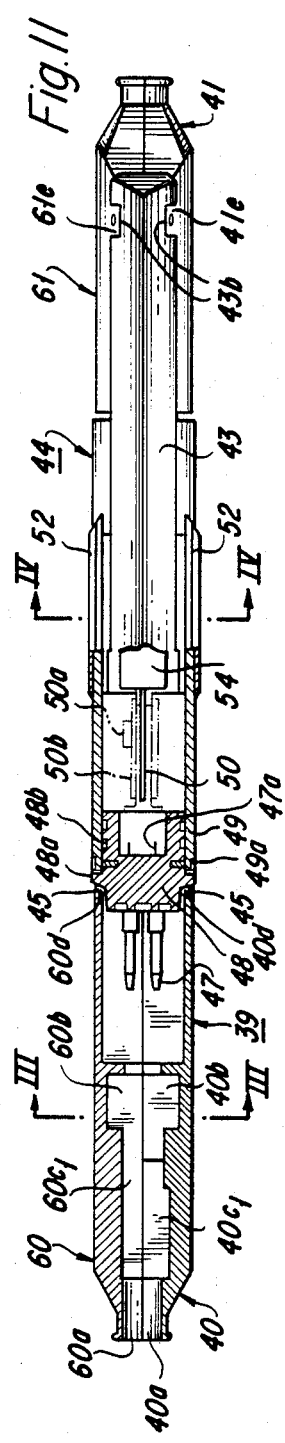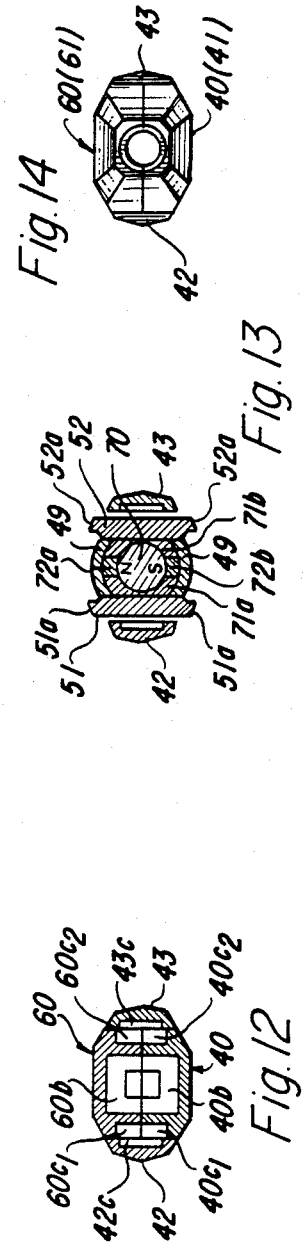

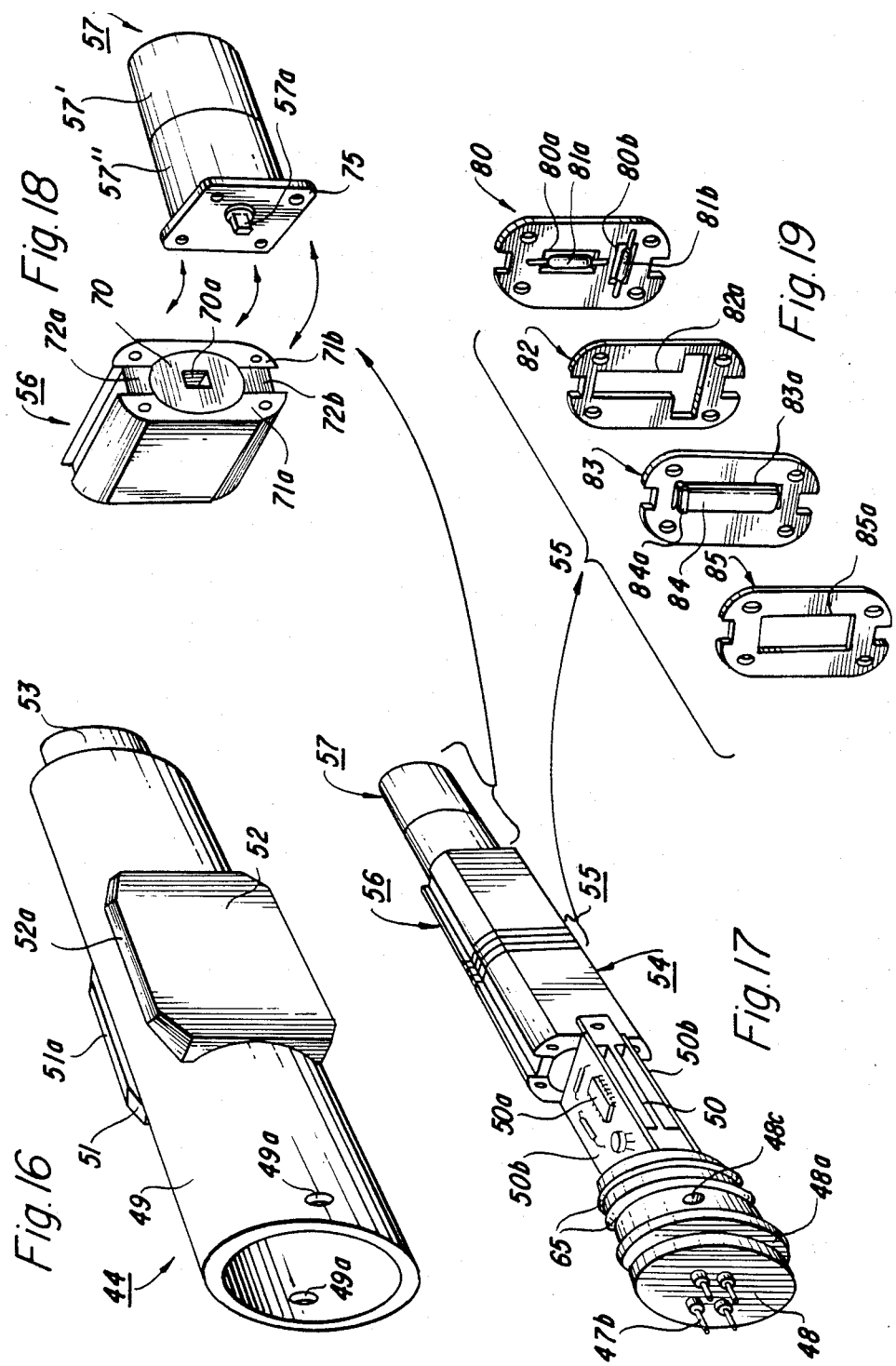

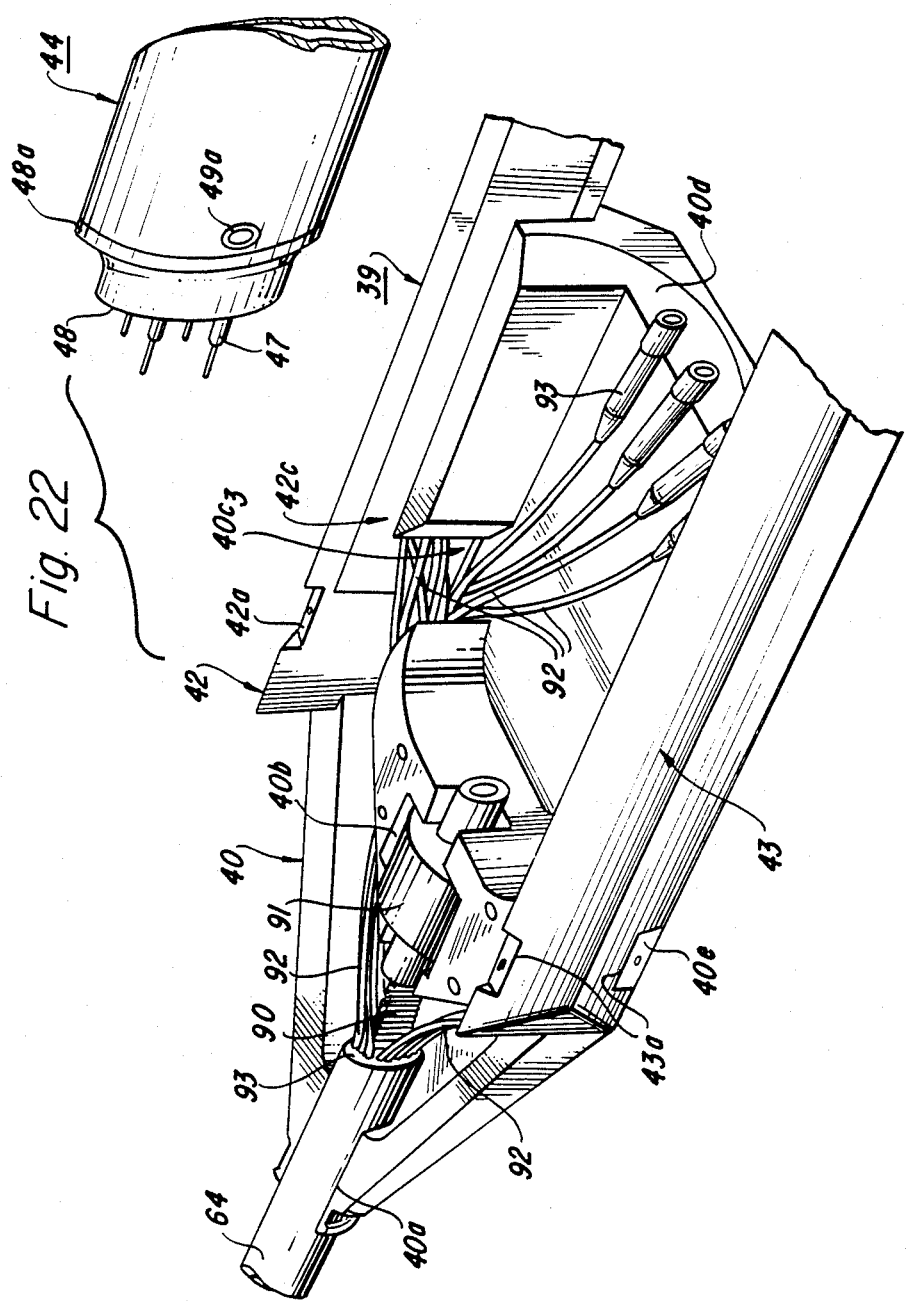

DOWNHOLE SEISMIC EXPLORATION DEVICE AND APPARATUS

BACKGROUND OF THE INVENTION

The present invention relates to geophysical exploration devices and apparatus, and particularly though not exclusively to downhole seismic tools to be lowered into a borehole extending into the earth and temporarily clamped in the borehole at a desired location for receiving waves travelling through the underground formations for analyzing the underground structure.

Downhole seismic exploration tools for use in geophysical exploration are well known in the art. Such a tool is generally elongated in shape so as to be moved up and down through a borehole drilled into the earth and typically includes a seismic detector, which is often referred to as a geophone, and a mechanical clamper for temporarily clamping the tool to the wall of the borehole at desired locations so as to pick up the seismic waves or disturbances travelling through the earth. When geophysical exploration is to be carried out with such a downhole seismic exploration tool, the tool is first lowered into the borehole using a cable and temporarily clamped to the wall of the borehole at a desired depth. Seismic waves or disturbances are created, for example by an air gun, and are picked up after travelling through the earth by the seismic detector provided inside the tool which is now temporarily clamped to the wall of the borehole. Then the tool is unclamped, moved to another depth and again temporarily clamped to the wall of the borehole for another measurement. In this manner, the tool is vertically traversed along the borehole and measurements are taken at different depths while having the tool temporarily clamped to the wall of the borehole.

A typical prior art downhole seismic exploration tool is extremely large in size, in particular in length, and can be as long as 6 meters and weigh as much as 17 kilograms. This mainly stems from the fact that the prior art tool uses a mechanical clamping device. As noted above, the tool must be temporarily clamped to the wall of the borehole, and for this purpose the tool must be provided with a clamping device. In the prior art tool, use is normally made of a mechanical clamping device having pivotally movable arms. The use of such a mechanical clamping device necessarily makes the tool large in size and weight.

SUMMARY OF THE INVENTION

It is therefore a primary object of the present inention to alleviate the disadvantages of the prior art as described above and to provide an improved downhole seismic exploration device and apparatus.

Another object of the present invention is to provide a downhole seismic exploration device which is significantly smaller in size and lighter in weight as compared with the typical prior art apparatus.

A further object of the present invention is to provide a downhole seismic exploration device which is suitable for use in an apparatus in the form of an array having a plurality of such devices disposed in series along a cable whereby the array of device can be temporarily clamped to the wall of the borehole at the same time thereby allowing a simultaneous, multi-point measurement to be carried out.

A still further object of the present invention is to provide a two-part downhole seismic exploration device comprising a sensor package, which includes a seismic detector, and a carrier which is connected to a cable and carries the sensor package acoustically decoupled from and substantially located within the carrier, thereby permitting an increase in the S/N ratio of the detected signal.

A still further object of the present invention is to provide a downhole seismic exploration device which is easy to handle and reliable in operation.

In accordance with one aspect of the present invention, there is provided a two-part downhole seismic exploration device which generally comprises a sensor package, which contains therein at least one seismic detector or geophone, and a carrier which is connected to a cable and which carries the sensor package substantially within the carrier and acoustically decoupled therefrom. In the preferred embodiment, the sensor package is generally cylindrical in shape and the carrier is generally in shape of a catamaran so that the cylindrical sensor package may be carried by the carrier cradled therein. In the preferred embodiment, O-rings are provided between the carrier and the sensor package so as to have them acoustically decoupled from each other. With this structure, the effects of so-called tube and cable waves, which travel in the longitudinal direction of the borehole, can be eliminated almost completely because only the carrier is subjected to such tube and cable waves. Even though a main cable may be slackened after an array of downhole seismic exploration devices is clamped in position, a cable wave may be produced and transmitted through the array; however, the acoustically decoupled structure of this invention allows the effect of such a cable wave on the sensor to be avoided.

In accordance with another aspect of the present invention, there is provided a downhole seismic exploration device including a magnetic clamper which can be turned on and off to thereby have the device clamped to and unclamped from the casing of the borehole. Preferably, such a magnetic clamper is provided inside the sensor package forming part of the two-part downhole seismic exploration device. In the turned-on condition, the magnetic flux is radiated outside the sensor package thereby allowing a closed magnetic loop to form through the casing of the borehole; on the other hand, in the turned-off condition, the magnetic flux is short circuited thereby preventing the magnetic flux from radiating outside the sensor package. Moreover, the sensor package preferably contains an electronics module for controlling the operation of the magnetic clamper and at least partly processing the signals picked up by the seismic detector.

A peizo bimorph shaker element is advantagelously included in the sensor package to vibrate the sensor package and test its clamping before acquisition of seismic data.

In accordance with a third aspect of the invention an array of downhole seismic exploration devices is provided, secured to and spaced along a cable and having provision for temporary clamping to the wall of a borehole, and arranged to be coupled in parallel to a measurement control unit.

BRIEF DESCRIPTION OF THE DRAWINGS

Additional objects and features of the invention will become more apparent upon consideration of the following detailed description of the invention, reference being had to the accompanying drawings in which:

FIG. 10 is a schematic illustration showing a specific embodiment of a two-part downhole seismic exploration device in accordance with the present invention;

FIG. 11 is a schematic, side-elevational view showing partly in cross section the structure of FIG. 10;

FIG. 12 is a schematic, cross-sectional view taken along line III—III indicated in FIG. 11;

FIG. 13 is a schematic, cross-sectional view taken along line IV—IV indicated in FIG. 11;

FIG. 14 is a rear end view of the structure shown in FIG. 11;

FIG. 16 is a schematic, perspective view showing the cylindrical housing 49 of sensor package 44;

FIG. 17 is a schematic, perspective view showing the components to be placed inside the housing 49;

FIG. 18 is a schematic illustration showing the connection between the clamping section 56 and the driver section 57;

FIG. 19 is a schematic, exploded view showing the detailed structure of test/motor switch section 55;

FIG. 22 is a schematic, exploded and fragmentary view showing in particular the connection between the cable 64 and the carrier 39;

DETAILED DESCRIPTION

Figure 1:
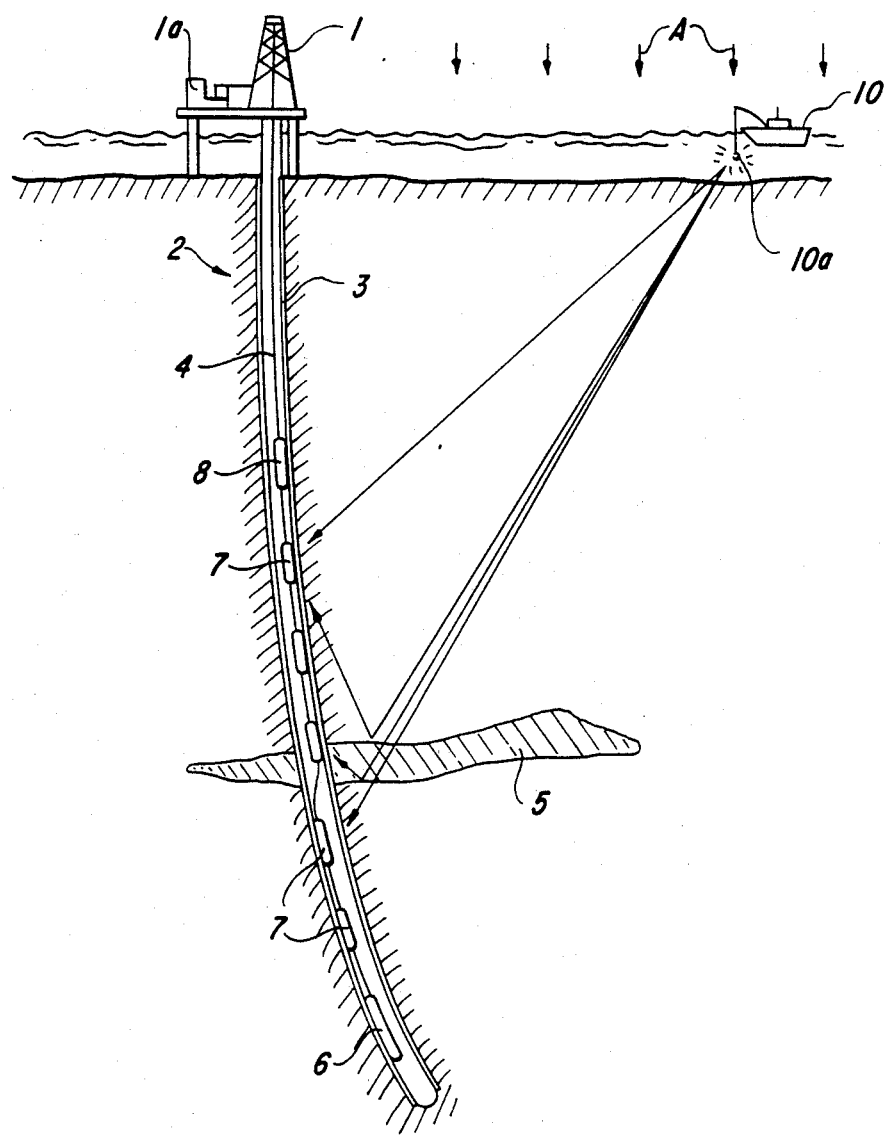
FIG. 1 is a schematic illustration showing a system of offshore geophysical exploration in which the present invention has been advantageously applied.

Referring now to FIG. 1, there is shown schematically an off-shore type geophysical exploration system in which an array of downhole seismic exploration devices in accordance with the present invention is in use. As shown, the exploration system includes an off-shore exploration rig 1 which supports thereon a measurement control unit 1a, including a data acquisition device or the like. A borehole 2 is drilled into the earth below the offshore exploration rig 1, and a casing 3 is fitted into the borehole 2 thereby defining the wall of the borehole 2. As is well known to one skilled in the art, the casing 3 comprises a plurality of cylindrical pipes connected in series end-to-end. In the illustrated example, it is important that the casing 3 comprise a magnetic material. The borehole 2 extends through several underground formations, only one of which is illustrated as a formation 5 in FIG. 1.

A downhole cable 4 extends downward from the offshore exploration rig 1 and into the borehole 2, and the cable 4 has one end connected to the measurement control unit 1a and the other end connected to a weight 6 which assists the downward movement of the cable 4 through the borehole 2. A plurality (five in the illustrated example) of downhole seismic exploration devices 7 are attached to the cable 4 spaced apart from each other. Also attached to the cable 4 above the plurality of downhole seismic exploration devices 7 is a carriage 8 for signal acquisition and telemetry. The downhole seismic exploration devices 7 may be temporarily clamped to the casing 3 for collecting seismic waves which have propagated through the formations. In the illustrated example, some of the devices 7 are clamped to the right side wall and the others are clamped to the left side wall as viewed in the figure. It is to be noted that the devices 7 define a generally vertical array and thus data originating from the same seismic source may be collected at a plurality of depths at the same time.

An exploration boat 10 located away from the offshore exploration rig 1 has a seismic source 10a, typically an air gun, which generates seismic waves or disturbances. When the seismic source 10a is excited, seismic waves are generated and they propagate through the underground formations. Some of the seismic waves reach the array of devices 7 directly after passing through the formations and some of the seismic waves reach the array of devices after having been reflected at the interface between the two formations where there is a change in acoustic impedance.

In operation, after having moved the downhole seismic devices 7 downward through the borehole 2 to desired locations, the devices 7 are temporarily clamped to the casing 3. Then, the seismic source 10a located at a distance away from the offshore rig 1 is excited to generate seismic waves. Thus the devices 7 collect the seismic waves propagating through the formations, with or without reflection, and transmit the collected data to the measurement control unit 1a through the cable 4. After having unclamped the devices 7 from the casing 3, the array of devices 7 is moved vertically to be located at different depths, and then the devices 7 are again clamped to the casing 3, followed by the steps of excitation of seismic source 10a and collection of seismic waves by the array of devices 7. In this manner the array of devices 7 is shifted in vertical position along the borehole 2 while being clamped and unclamped to and from the casing 3 to collect seismic information at different depths. This is particularly advantageous over the prior art using only a single seismic exploration device because the array of devices 7 can collect seismic information originating from the same seismic source 10a, providing enhanced reliability in data acquisition, and the time required to take measurements at different depths can be significantly reduced.

It is to be noted that the seismic source 10a may be located at different horizontal distances from the offshore exploration rig 1 as indicated by the arrow A and the vertical traverse of the array of devices 7 may be repetitively carried out for each horizontal distance A, if desired.

Figure 2:
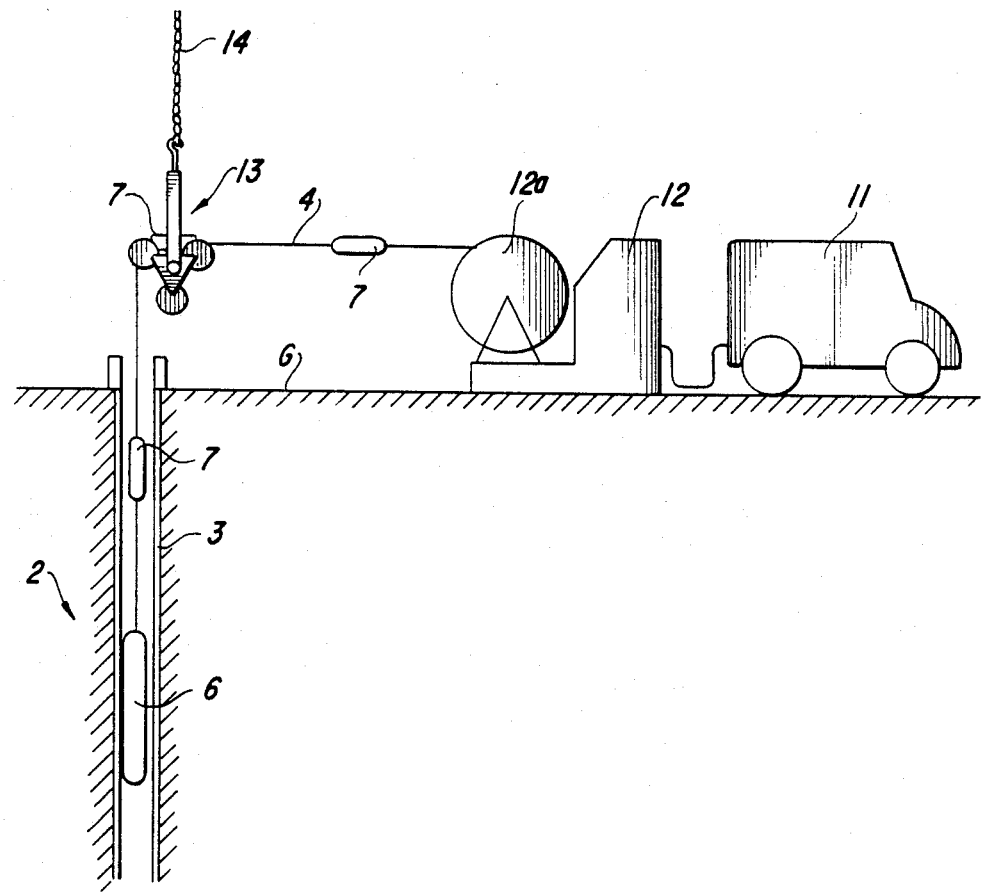
FIG. 2 is a schematic illustration showing a system of onshore geophysical exploration in which the present invention has been advantageously applied.

FIG. 2 shows an onshore type geophysical exploration system in which an array of downhole seismic devices embodying the present invention is in use. As shown, in this case the borehole 2 extends into the earth from a ground surface G and the casing 3 is fitted into the borehole 2 to define its cylindrical wall. An exploration vehicle 11, which carries thereon a measurement control unit (not shown), is parked on the ground surface G located close to the mouth of the borehole 2. A winch 12 is located adjacent to the vehicle 11 and the winch 12 has a winch drum 12a having a relatively large diameter. Around the drum 12a is wound the cable 4 to which a plurality of downhole seismic devices 7 are fixedly attached, spaced apart from each other. The winch drum 12a is rotatably supported on the winch 12, and, as the drum 12a rotates counterclockwise, the cable 4 unwinds from the drum 12a and descends into the borehole 2 via a three-pulley guide assembly 13 which is suspended in position by means of a chain 14. It is to be noted that this three-pulley guide assembly 13 may, of course, also be used in the aforementioned off-shore type system.

Figure 3:
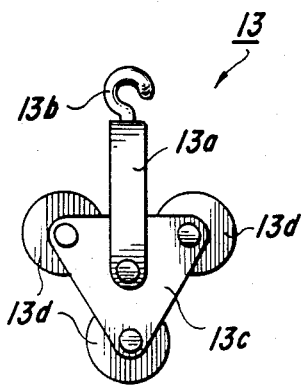
FIG. 3 is a front view showing the three-pulley guide assembly 13 provided in the system of FIG. 2.
Figure 4:
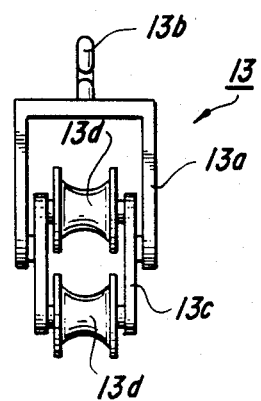
FIG. 4 is a side elevational view of the guide assembly 13 shown in FIG. 3.
Figure 5A:
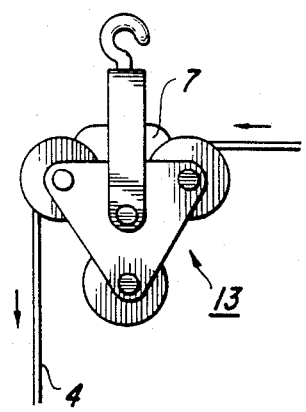
FIGS. 5a through 5c are schematic illustrations useful for explaining the operation of the guide assembly 13.
Figure 5B:
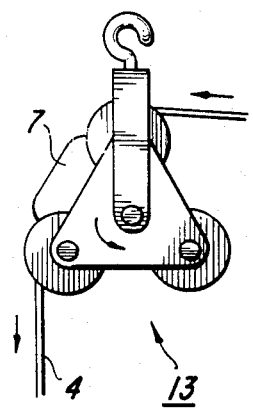
Figure 5C:
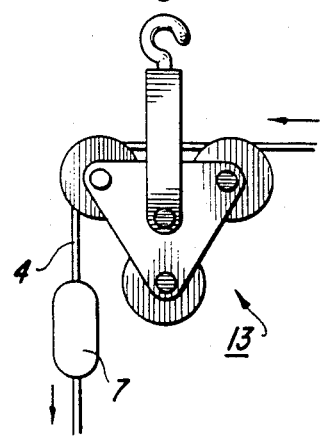

The detailed structure of the three-pulley guide assembly 13 is shown in FIGS. 3 and 4. As shown, the guide assembly 13 includes an inverted U-shaped support 13a to which is fixedly attached a hook 13b. The support 13a rotatably supports a pair of triangular plates 13c between which three pulleys 13d are rotatably provided. The operation of this guide assembly 13 may be best illustrated when reference is made to FIGS. 5a-5c. As shown in FIG. 5a, as the cable 4 unwinds from the winch drum 12a, the cable 4 advances as indicated by the arrows because of the pulling force applied to the cable 4 by the weight 6, and thus one of the downhole seismic exploration devices 7 comes to ride on the two pulleys 13d. Then, as the cable 4 advances further, the pair of triangular plates 13c rotates counter clockwise as indicated by the arrow in FIG. 5b while keeping the device 7 riding on the two adjacent pulleys 13d. FIG. 5b shows the condition in which the pair of triangular plates 13c have turned through 60°. Then, when the cable 4 advances still further, the device 7 moves away from the pulleys 13d and the pair of triangular plates 13c takes the position shown in FIG. 5c and remains stationary until the next device 7 comes along. In this manner, the pair of triangular plates 13c turns through 120° each time one of the devices 7 passes through the guide assembly 13.

Figure 6:
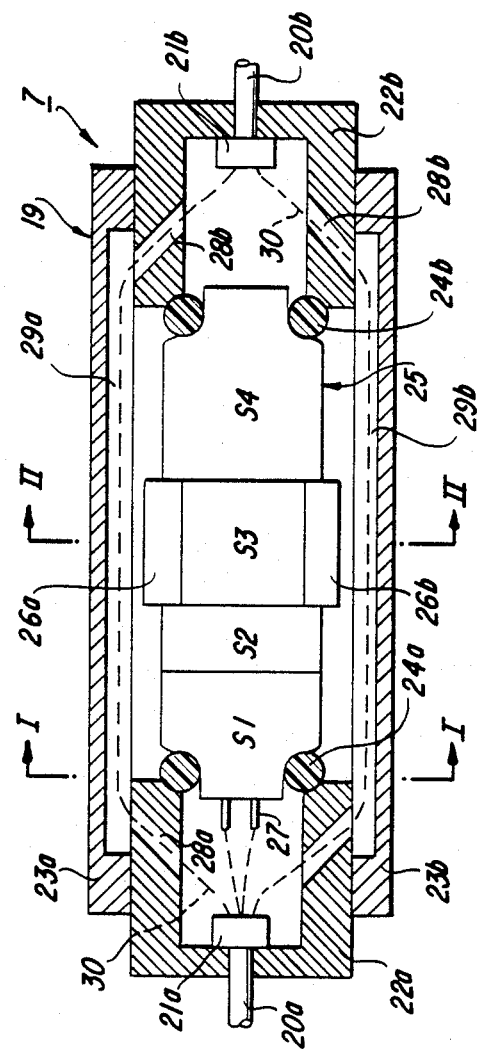
FIG. 6 is a schematic illustration showing the basic structure of a two-part downhole seismic exploration device embodying the present invention.
Figure 8:
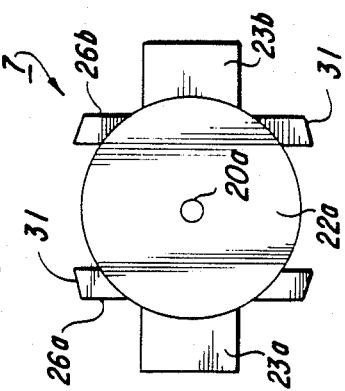
FIG. 8 is a schematic, transverse cross-sectional view taken along line I—I indicated in FIG. 6.
Figure 7:
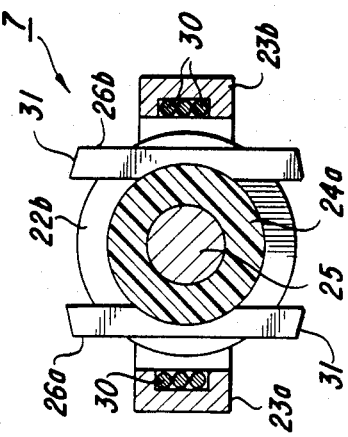
FIG. 7 is a schematic illustration showing the front view of the structure shown in FIG. 6.

The structure of the downhole seismic exploration device 7 employed in the exploration system shown in FIGS. 1 and 2 will now be described in detail with reference to FIGS. 6 through 8. It is to be noted that FIGS. 6 through 8 are all schematic in nature so as to aid the understanding of important aspects of the present downhole seismic exploration device 7. As shown in FIG. 6, the downhole seismic exploration device 7 has a two-part structure: (1) a carrier 19 including a pair of end blocks 22a and 22b and a pair of side blocks 23a and 23b, and (2) a sensor package 25. When assembled, the carrier 19 defines an inner space within the end and side blocks 22a, 22b, 23a and 23b, in which the sensor package 25 is set in position via O-rings 24a and 24b. The provision of O-rings 24a and 24b allows the sensor package 25 to be acoustically decoupled from the carrier 19 even though it is supported in position by the carrier 19.

As shown in FIG. 6, the carrier 19 includes a front end block 22a having a center opening through which a cable 20a extends. A stopper 21a is fixedly attached to one end of the cable 20a so that the cable 20a is in engagement with the front end block 22a. The cable 20a contains a plurality of electrical conductors 30, some of which are connected to connector pins 27 of the sensor package 25 while the other conductors 30 extend into a pair of guide passages 28a formed in the front end block 22a. The carrier 19 also includes a rear end block 22b which is similar in structure to the front end block 22a. The rear end block 22b engages a cable 20b having a stopper 21b at one end and is provided with a pair of guide passages 28b. The side blocks 23a and 23b extend in parallel between the front and rear end blocks 22a and 22b when assembled. Each of the side blocks 23a and 23b is elongated in shape and provided as bridging between the front and rear end blocks 22a and 22b. The side blocks 23a and 23b are partly recessed to define intermediate guide passages 29a and 29b, respectively, so that a conduit is defined by the guide passages 28a, 29a (or 29b) and 28b. The provision of such a conduit is particularly advantageous because, when the devices 7 are disposed in series as shown in FIG. 1 or 2 in the form of an array, the device 7 can be connected in parallel to the host unit, such as measurement control unit 1a, in which case a failure of one device 7 would not result in the failure of the total apparatus.

The sensor package 25 is generally cylindrical and elongated in shape and is fitted into the internal space defined by the carrier 19 to improve the S/N ratio by preventing tube waves and cable waves from reaching the sensor package. The sensor package 25 is supported by the carrier 19, but since this support is provided through the O-rings 24a and 24b, the package 25 is acoustically decoupled from the carrier 19. For this purpose, the O-rings 24a and 24b preferably comprise an elastic material, such as rubber. The sensor package 25 has a front end which is shaped to define a seat for keeping the O-ring 24a in position as received therein and a similar rear end shaped to receive an keep the O-ring 24b in position. The O-rings 24a and 24b are abutment against shoulders defined at the forward ends of end blocks 22a and 22b.

The sensor package 25 generally comprises four sections S1-S4 arranged along its longitudinal axis. Section S1 is a control section which contains various electronics for controlling the operation of the device 7 and section S2 is a detector section which contains at least one seismic detector or geophone. Section S3 is a clamping section for temporarily clamping the sensor package 25 to the casing 3 and section S4 is a driver section for driving the clamping section S3. In the preferred embodiment, the clamping section S3 includes a magnetic clamper employing a permanent magnet. The clamping section S3 also includes a pair of clamping plates 26a and 26b which are arranged approximately in parallel on both sides of the sensor package 25 and which form part of two pole pieces for guiding the path of magnetic flux. It is to be noted that each of the clamping plates 26a and 26b has a top and bottom mating side surface 31 which is brought into intimate contact with the inner peripheral surface of the casing 3. The mating side surface 31 is suitably inclined or curved so that the surface 31 can be brought into intimate contact with the inner peripheral surface of the casing 3. Accordingly, when the device 7 is clamped to the casing 3, only the sensor package 25 is effectively clamped to the casing 3 with the mating surfaces 31 of clamping plates 26a and 26b in contact with the inner peripheral surface of the casing 3, so that the sensor package 25 is effectively isolated from the carrier 19 as far as vibration is concerned. It should be understood that the sensor package 25 may be clamped to the casing 3 in one of two ways, i.e., in the upward or downward direction in FIGS. 7 and 8. If desired, provision may be made for an eccentralizer for bringing the device 7 closer to the casing as is well known to one skilled in the art.

Figure 9A:
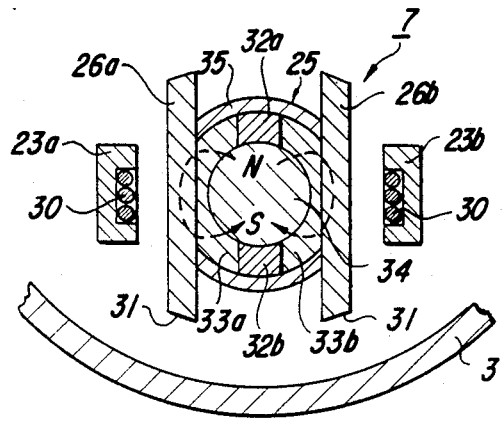
FIGS. 9a and 9b are schematic, transverse cross-sectional views taken along line II—II indicated in FIG. 6 useful for explaining the operation of a clamping section of the device.
Figure 9B:
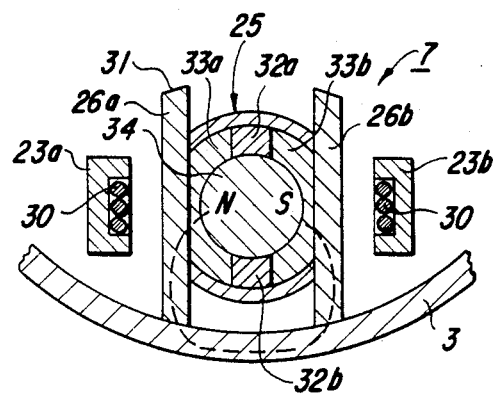

FIGS. 9a and 9b schematically show the internal structure of the magnetic clamping section S3. As shown, the sensor package 25 includes a cylindrical housing 35 which houses therein various components in an air and pressure tight condition. Inside and along the inner peripheral surface of the housing 35 are provided a pair of top and bottom magnetic flux separators 32a and 32b and a pair of left and right magnetic flux guide members 33a and 33b. The seprators 32a and 32b comprise a nonpermeable material; whereas, the guide members 33a and 33b comprise a permeable material thereby defining part of the afore-mentioned pole pieces. The separators 32a, 32b and the guide members 33a, 33b approximately define a ring when assembled as shown in FIGS. 9a and 9b. Inside this ring is disposed a permanent magnet 34 having a pair of N and S poles, which is generally cylindrical in shape and rotatably supported. The magnet 34 preferably comprises rare earth cobalt. As described previously, the pair of clamping plates 26a and 26b also comprise a magnetically permeable material and thus they also define part of the two pole pieces.

The clamping and unclamping operation of the above-described magnetic clamper will now be described with reference to FIGS. 9a and 9b. As mentioned before, the permanent magnet 34 is rotatable with respect to the separators 32a, 32b and guide members 33a, 33b which are fixed to the housing 35, and, when the magnet 34 is oriented such that its poles N and S are located at top and bottom as shown in FIG. 9a, i.e., adjacent the flux separators 32a and 32b, the magnetic fluxes are short-circuited between the poles N and S via the corresponding guide member 33a (33b) and clamping plate 26a (26b), as indicated by the dotted lines in FIG. 9a. Here, this condition is designated as an OFF condition, indicating the absence of clamping function. On the other hand, if the magnet 34 is rotated through 90° from the condition shown in FIG. 9a, the magnet 34 is oriented such that its poles N and S are located at left and right as shown in FIG. 9b, i.e., adjacent the flux guide members 33a and 33b. In this case, since the magnetic flux separator 32b (32a), comprising a magnetically non-permeable material, is present between the guide members 33a and 33b, the magnetic flux emanating from the N pole tends to be directed outside the sensor package 25. Since the clamping plates 26a and 26b comprise a magnetically permeable material, a closed magnetic circuit is defined by the pair of clamping plates 26a and 26b and the casing 3 as indicated by the dotted line in FIG. 9b. As a result, the clamping plates 26a and 26b are clamped to the casing 3 by magnetic attraction. This condition will be refrred to as an ON condition since the device 7 or sensor package 25 is clamped to the casing 3. It is preferred that any gap between the mating surface 31 and the inner peripheral surface of the casing 3 be as small as possible, desirably zero, in order to attain an enhanced clamping effect.

It should thus be understood that the ON and OFF conditions are established alternately each time that the cylindrical magnet 34 is rotated through 90°. Thus, all that is required to establish the ON/OFF condition is the rotation of the cylindrical magnet 34 and nothing else. This feature is advantageous because the torque requirements for clamping operation are substantially constant and significantly lower than the case in which displacement motion, such as a lever action, is involved. As will be made clear, a driver for the magnet 34 may be a simple motor, which can contribute to making the overall structure of device 7 compact in size and light in weight.

A downhole seismic exploration device constructed in accordance with the present invention will now be described in detail with reference to FIGS. 10 through 22. It will be understood that this specific embodiment has the basic structure shown schematically in FIGS. 6-8. Thus the device has a two-part structure including a carrier 39 and a sensor package 44. The carrier 39 is formed by a pair of top and bottom front end blocks 60 and 40, a pair of top and bottom rear end blocks 61 and 41 and a pair of side blocks 42 and 43. It is to be noted that the top and bottom front end blocks 60 and 40 are similarly constructed excepting minor differences and they are put together at their mating surfaces when assembled to define a front end block assembly.

FIG. 10 shows the downhole seismic exploration device generally in plan view with the top front and rear end blocks 60 and 61 removed and the sensor package 44 sectioned along the horizontal longitudinal plane. As shown, the bottom front end block 40 is relatively flat and elongated in shape and provided with a front bottom groove 40a, semicircular in cross section, which, together with a front top groove 60a, also semicircular in cross section, in the top front end block 60, defines a mouth through which a cable, typically a composite cable including a steel wire, a plurality of clad electrical conductors arranged around the wire and a protective sheath which encloses the wire and the conductors, may extend. Preferably, a rubber jacket may be provided at the mouth to protect the cable. The block 40 is also provided with a lock socket 40b for receiving therein a stopper fixedly attached to the steel wire which forms a core of the cable as will become clear later. Also provided in the block 40 is a pair of recessed guide passages $40c_1$ and $40c_2$ which extend in a bifurcate fashion from the groove 40a. These guide passages $40c_1$ and $40c_2$ are connected to intermediate guide passages 42c and 43c (FIG. 12) recessed in the side blocks 42 and 43, respectively. Provided in the block 40 in communication with the guide passage $40c_1$ is a lead-in guide passage $40c_3$. Thus, the electrical conductors of the cable extend along the bifurcate guide passages $40c_1$ and $40c_2$ as divided and some of the conductors extending along the passage $40c_1$ extend along thelead-in passage $40c_3$ to be connected to connectors 47 of the sensor package 44. In the illustrated embodiment, the rear end of the block 40 is provided with an inclined shoulder 40d.

As shown in FIG. 11, when the top and bottom front end blocks 60 and 40 are put together, there are defined a mouth 40a, passages 40c and a circumferentially continuous and inwardly inclined shoulder 40d. Although there are some differences, the top and bottom rear end blocks 61 and 41 are constructed based on the similar principle. For example, the bottom rear end block 41 is provided with a groove 41a, semi-circular in cross section, a lock socket 41b, a pair of bifurcate guide passages 41c$_1$ and 41c$_2$, and an inclined shoulder 41d. It is to be noted, however, that each of the end blocks 40, 41, 60 and 61 is provided with a pair of engaging projections, e.g., 41e for the block 41 and 61e for the block 61 as shown in FIG. 11, each of which may be brought into engagement with the corresponding engaging notch provided in each of the side blocks, such as 42a and 42b for the block 42 and 43a and 43b for the block 43.

When the carrier 39 is assembled, an internal space is defined which is open on two sides and into which the sensor package 44 may be fitted. The sensor package 44 is generally cylindrical in shape and includes four sections as described with reference to FIG. 6. Described in detail, the sensor package 44 includes a cylindrical housing 49 and a pair of front and rear end members 48 and 53 which are sealingly fitted into the respective ends of the housing 49. The front end member 48 is provided with connectors 47 which extend outside the sensor package 44 in the forward direction and which is connected to internal connection pins 47a. Also provided in the front end member 48 is a circumferential ridge 48a which defines a seat for receiving and keeping in position an elastic O-ring 45. The circumferential ridge 48a also serves as a stopper flange against which one end of the cylindrical housing 49 is abutted. In addition, the front end member 48 is provided with a pair of circumferential grooves 48b in which elastic O-rings may be fitted to provide an enhanced sealing.

Next to the front end member 48 and inside the cylindrical housing 49 is defined a control section 50, in which a pair of printed circuit boards 50b is provided, fixedly attached to a support plate 50, and each having various electrical and electronics components mounted thereon, e.g., an I.C. chip 50a. The control section 50 is electrically connected to a host unit, such as a data acquisition system, and the overall operation of the present seismic exploration device, such as clamping-/unclamping and detection of seismic data, is controlled by the control section 50. Next to the control section 50 is provided a detector section 54 wherein one or more seismic detectors or geophones may be disposed. Preferably, three seismic detectors identical in structure but oriented mutually orthogonally from each other are provided in the detector section 54. Such a three-dimensional arrangement of three identical seismic detectors is advantageous because it allows acquisition of seismic signals propagating in any direction.

Next to the detector section 54 is provided a test/motor switch section 55 which includes a piezo shaker for testing the clamping condition and a motor switch for automatically turning off a driving source for changing the clamping/unclamping condition as will become clear later. A clamping section 56 is provided next to the test/motor switch section 55, and, as will become clear later, the clamping section 56 contains a magnetic clamper employing a permanent magnet. As also shown in FIG. 13 in cross section, the clamping section 51 is also provided with a pair of clamping plates 51 and 52 arranged in parallel along the longitudinal direction and spaced apart from each other. The clamping plates 51 and 52 comprise a magnetically permeable material and are fixedly attached to and define part of the cylindrical housing 49. It is to be noted that the clamping plates 51 and 52 have a transverse length which is larger than the outer diameter of the cylindrical housing 49 and their side surfaces 51a and 52a are beveled, curved or otherwise machined appropriately such that they may be brought into intimate contact with the inner peripheral surface of the casing 3 when set in clamped condition so as to attain the strongest attractive force under given conditions. This is because the presence of any gap between the side surface 51a or 52a and the casing 3 tends to lower the density of magnetic flux thereby reducing the magnetic attractive force.

As best shown in FIG. 13, at the clamping section 56, there are provided a pair of top and bottom magnetic flux separators 72a and 72b, which comprise a magnetically non-permeable material, and a pair of side guides 71a and 71b, which comprise a magnetically permeable material. These separators 72a, 72b and side guides 71a, 71b are arranged along and fixedly attached to the inner peripheral surface of the cylindrical housing 49 generally in the form of a supporting ring. A cylindrical permanent magnet 70 having a pair of magnetic poles N and S and preferably comprising rare earth cobalt is disposed rotatably inside the support ring defined by the separators 72a, 72b and side guides 71a, 71b. Since the structure shown in FIG. 13 is basically the same as shown in FIGS. 9a and 9b, the operation of the clamping section 50 will be self-explanatory when reference is made to that portion of the description with reference to FIGS. 9a and 9b. It is thus clear that the condition shown in FIG. 13 corresponds to the OFF condition wherein the magnetic flux is short-circuited and the unclamping condition is established.

Next to the clamping section 56 is provided a driver section 57 for rotating the permanent magnet 70 inside the clamping section 56. The driver section 57 is basically divided into two sub-sections: a DC motor and a gear assembly, as will become clear later. The driver section 57 has a driving shaft 57a which is operatively coupled to the permanent magnet 70. As will be made clear later, when the DC motor of the driver section 57 is energized, the permanent magnet 70 starts to rotate, and when the permanent magnet 70 has turned through 90°, this is automatically detected by the motor switch of section 55 and the DC motor is turned off thereby establishing the clamping/unclamping condition.

It should further be noted that the rear end member 53 is also sealingly fitted into the rear end of the cylindrical housing 49 and is provided with a circumferential ridge 53a which serves as a stopper flange against the rear end of the cylindrical housing 49 and a seat for keeping an elastic O-ring 46 in position as received therein. The elastic O-ring 46 is interposed between the circumferential ridge 53a and the inclined shoulder 41d and 61d (not shown) of bottom and top rear end blocks 41 and 61. As mentioned before, the O-rings 45 and 46 interposed between the carrier 39 and the sensor package 44 effectively function as a damper for absorbing vibrations so that undesired vibrations, such as those originating from tube waves, are prevented from being imparted to the sensor package. In addition, other undesired vibrations, which may be transmitted through the downhole cable, are also prevented from being applied to the sensor package 44 through the carrier 39. In this sense, the sensor package 44 is acoustically decoupled from the carrier 39.

Figure 15:
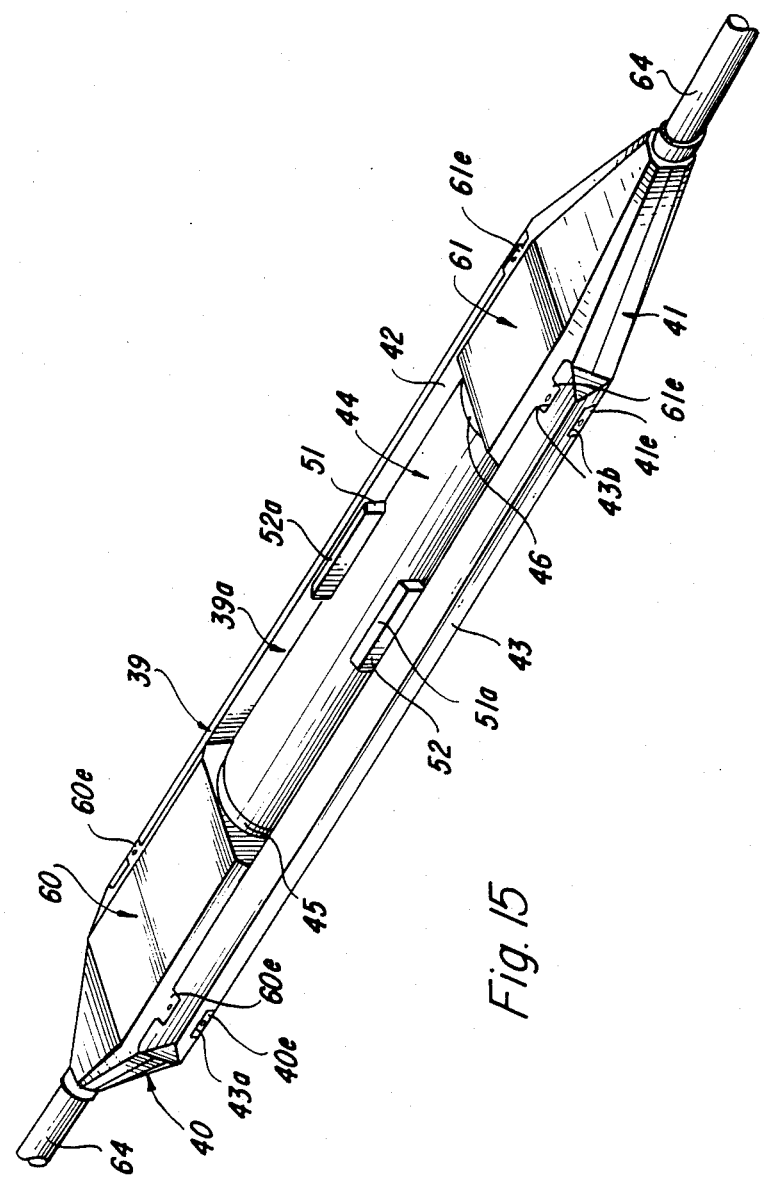
FIG. 15 is a schematic, perspective view showing the downhole seismic exploration device as assembled and connected to the cable 64.

FIG. 15 shows in perspective the overall structure of the present downhole seismic exploration device as assembled and connected to a downhole cable 64 at both ends. As described previously, the seismic exploration device includes the carrier 39, which is generally in the shape of a catamaran and thus has an internal space 39a open at opposite sides, and the sensor package 44 located in the internal space 39a by means of the elastic O-rings 45 and 46 interposed between the carrier 39 and the sensor package 44. In this configuration, the sensor package 44, which needs to be clamped for taking seismic measurements, has a length of the order of 0.25 meters and a weight of the order of 4 kilograms. It should be understood that the carrier 39 basically may have any desired length and weight because the carrier 39 effectively forms part of the cable 64 and is functionally isolated from the sensor package 44 as far as seismic measurements are concerned.

Some aspects of the internal structure of the sensor package 44 will now be described in detail with particular reference to FIGS. 16 through 19. As shown in FIG. 16, the cylindrical housing 49, which basically defines an outside enclosure of the sensor package 44 is provided with the pair of clamping plates 51 and 52 secured thereto. That is, in manufacture, the cylindrical housing 49 is partly cut-away to receive therein the pair of clamping plates 51 and 52, which are then secured to the housing 49, for example by welding. A pair of mounting holes 49a are provided at the front end of the cylindrical housing 49, through which bolts may be inserted into threaded holes 48c provided in the front end members 48 so that the front end member 48 is fixedly attached to the housing 49.

FIG. 17 shows the contents of the sensor package 44 and as described previously it includes the control section 50, detector section 54, test/motor switch section 55, clamping section 56 and driver section 57 in order from the front end to the rear end. The control section 50 has a support plate having one end fixedly attached to the front end member 48 and the opposite end fixedly attached to the detector section 54. On the support plate are fixedly attached two printed circuit boards 50b on opposite sides, each of the p.c. boards 50b having various electrical and electronics elements 50a mounted thereon. The front end member 48 has outside connector pins 47b which are enclosed by connectors 47, and a pair of rubber O-rings 65 are fitted in the circumferential grooves 48b formed in the front end member 48. As described above, the front end member 48 is also provided with a pair of threaded holes 48c, only one of which is shown in FIG. 17, for allowing a bolted connection between the front end member 48 and the cylindrical housing 49.

The detector section 54 may take any form well known to one skilled in the art to provide any desired seismic detector therein.

The detailed structure of the test/motor switch section 55 is shown schematically in FIG. 19. As shown, this section 55 includes four plates having identical contours, which are put together one on top of another when assembled. A switch plate 80 is formed with a pair of elongated slots 80a and 80b arranged perpendicularly to each other in the shape of a "T" and is provided with a pair of reed switches 81a and 81b located at least partly in the respective slots 80a and 80b. Also provided is a switch spacer plate 82 which is formed with a T-shaped slot 82a corresponding in the T-shaped arrangement of the reed switches 81a and 81b.

There is also provided a piezo shaker plate 83 which is formed with a rectangular slot 83a and which is provided with a piezo shaker 84 typically comprising a so-called bimorph element. In the illustrated example, the piezo shaker 84 is rectangular in shape and has one end fixed to the plate 83 by means of a fixing element 84a in a cantilever fashion. Thus, the piezo shaker 84 may be set in vibration when energized to apply vibration to the sensor package 44 thereby providing a check on the clamping condition between the sensor package 44 and the casing 3. Finally, a shaker spacer plate 85 is provided and is formed with a rectangular slot 85a for receiving therein the piezo shaker 84 at least partly when assembled. The use of a piezo shaker is advantageous in comparison to the conventional use of a geophone shaker, because the risk of electro-magnetic coupling between the shaker and the detecting geophone is eliminated, thereby avoiding the need for a large shaker-geophone spacing and permitting the sensor package to be more compact. In addition, the piezo shaker is itself substantially smaller than a geophone, permitting an additional reduction in space requirements.

FIG. 18 shows in detail the connection between the clamping section 56 and the driver section 57. As described before, the clamping section 56 includes the pair of top and bottom separators 72a and 72b of magnetically non-permeable material and the pair of left and right side guides 71a and 71b of magnetically permeable material, which are arranged generally in the form of a supporting ring in which the cylindrical permanent magnet 70 having a pair of N and S poles is rotatably received. The magnet 70 is provided at its center with a receiving hole 70a rectangular in cross section as shown. On the other hand, the driver section 57 includes a DC motor 57' and a gear assembly 57'' which is operatively coupled to the DC motor 57'. The gear assembly 57'' has a driving shaft 57a which extends outside and which has a rectangular cross section corresponding in shape to the receiving hole 70a in order to be received therein. In this manner, the cylindrical magnet 70 is operatively coupled to the DC motor 57' for rotation through an engagement between the receiving hole 70a and the driving shaft 57a.

Figure 20:
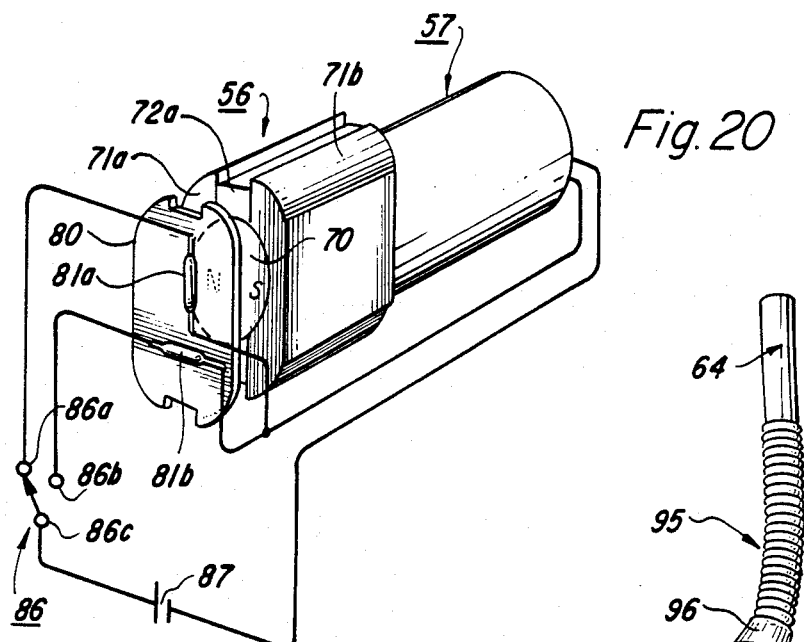
FIG. 20 is a schematic illustration showing the automatic shut-off mechanism for the driver section 57.
Figure 21A:
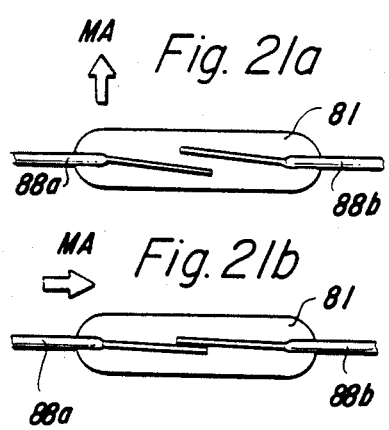
FIGS. 21a and 21b are schematic illustrations useful for explaining the operation of a reed switch.
Figure 21B:
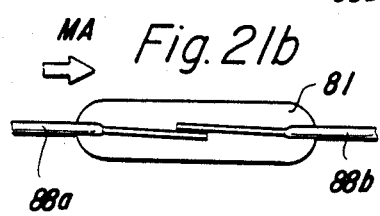

FIG. 20 shows in schematic form the relative positions of the clamping section 56 and the switch plate 80. As shown, the reed switch 81a is arranged vertically and the other reed switch 81b is arranged horizontally. The vertical reed switch 81a has one terminal connected to a first contact 86a of a switch 86 and its other terminal connected to the DC motor 57 and to one terminal of the horizontal reed switch 81b, which has its other terminal connected to a second contact 86b of switch 86, which, in turn, has a common contact 86c connected to the DC motor 57 through a power source 87. First, the operation of the reed switch 81 having a pair of terminals 88a and 88b will be briefly described with reference to FIGS. 21a and 21b. As shown in FIG. 21a, if the direction of magnetic flux MF is perpendicular to the reed switch 81, the reed switch 81 is set in an off state whereby the two terminals 88a and 88b are disconnected; whereas, if the direction of magnetic flux MF is parallel to the reed switch 81, the reed switch 81 is set in an on state whereby the two terminals 88a and 88b are connected to each other.

In the condition illustrated in FIG. 20, the rotatable magnet 70 is so oriented to locate its pair of N and S poles horizontally. Accordingly, the reed switch 81a is maintained in the of state because the direction of magnetic flux in this situation is perpendicular to the reed switch 81a and on the other hand the reed switch 81b is maintained inthe on state because the direction of magnetic flux is parallel to the reed switch 81b. Since the reed switch 81a is cut off, no current is supplied to the driver 57 even though the switch 86 has its common contact 86c connected to the first contact 86a as shown. If the switch 86 is operated to establish connection between the common contact 86c and the second contact 86b, then current is supplied to the driver 57 because the reed switch 81b is in the on state. As a result, the DC motor 57' is driven to rotate the magnet 70, and, as the magnet 70 rotates, the direction of magnetic flux produced by the magnet 70 also rotates. Thus, when the magnet 70 has rotated through 90°, the direction of magnetic flux becomes perpendicular to the horizontal reed switch 81b to cause it to be turned off so that the supply of current to the DC motor 57' is automatically shut off thereby stopping the rotation of magnet 70. At the same time, the vertical reed switch 81a is turned on since the direction of magnetic flux in this condition is parallel to the vertical reed switch 81a. In this manner, with the arrangement of the pair of reed switches 81a and 81b in the shape of a "T", or perpendicular to each other, the magnet 70 is driven to rotate through 90° each time that the switch 86 is operated. It should be understood that the switch 86 is preferably implemented as an electronic switch mounted on one of the printed circuit boards 50b in the control section 50.

Figure 25:
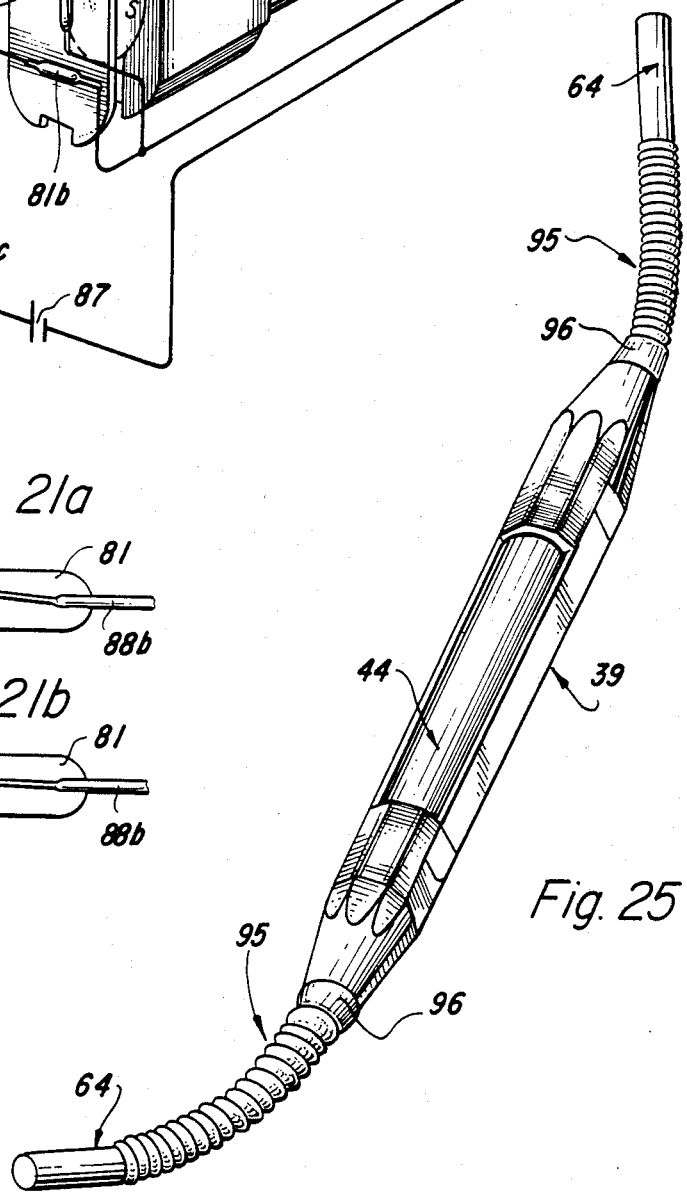
FIG. 25 is a schematic perspective view of the downhole seismic exploration device showing provision for protecting the cable 64.

Now, turning to FIGS. 22 and 25, the connection between the composite cable 64 and the carrier will be described in detail. FIG. 22 is a schematic, exploded and fragmentary view showing the sensor package 44 located above the carrier 39 with the top front end block 60 removed. As shown, the composite cable 64 includes a steel wire 90 defining the core of the cable 64, a plurality of clad conductors 92 arranged around the steel wire 90 and a protective sheath 93. At one end of the steel wire 90 is fixedly attached a stopper 91 which is placed inside the lock socket 40b forming an integral part of the bottom front end block 40. The cable 64 is partly fitted in the groove 40a formed in the bottom front end block 40. Thus, the carrier 39 is mechanically connected to the cable 64 through an engagement between the stopper 91 and the lock socket 40b. In addition, and as shown in FIG. 25, the cable 64 is preferably protected against excessive bending at the points where it joins the carrier 39, for example during lifting of the tool to place it in the borehole, by means of strong spring boots 95. These boots enclose and extend along the cable 64, and have mounting rings 96 which fit over the ends of the carrier 39 and are secured thereto by fixing screws (not shown). The boots 95 are strong enough to limit the curvature which can be applied to the cable 64 adjacent the carrier 39, even when the cable is pulled at right angles to the carrier 39.

The conductors 92 extend along the bifurcate guide passages on both sides of the lock socket 40b and they extend into the conduit guide passages 42c and 42c formed in the side blocks 42 and 43, respectvely. As shown in FIG. 22, some (four in the illustrated example) of the conductors 92 pass through the lead-in passage 40c3 so as to be connected to the connectors 47 of the sensor package 44. It is to be noted that the inwardly inclined shoulder 40d is shown to be formed at the bottom edge of the block 40 so as to receive the elastic O-ring 45. Conventional rubber boots 93 are provided at the ends of those conductors passing through the lead-in passge 40c3 in order to protect the connection between the conductors 92 and the connectors 47.

When the downhole seismic exploration device is constructed to have a two-part structure including a carrier and a sensor package as described above, it is only necessary to have the sensor package clamped to the casing of the borehole, so the sensor package can be made small in size and light in weight so as to obtain seismic data with high accuracy and reliability. Because of this, such a seismic exploration device can be incorporated in apparatus in the form of an array as described above; alternatively it can be used in combination with other types of geophysical exploration apparatus, such as so-called sonic and density apparatus.

Figure 23:
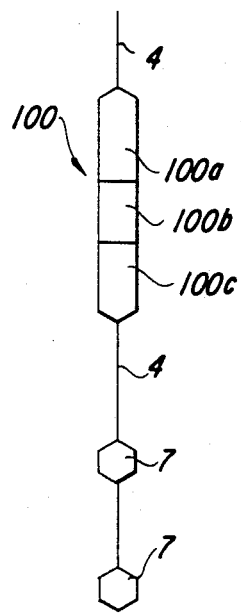
FIGS. 23 and 24 are schematic illustrations showing two exemplary combinations of various apparatus for geophysical exploration.
Figure 24:
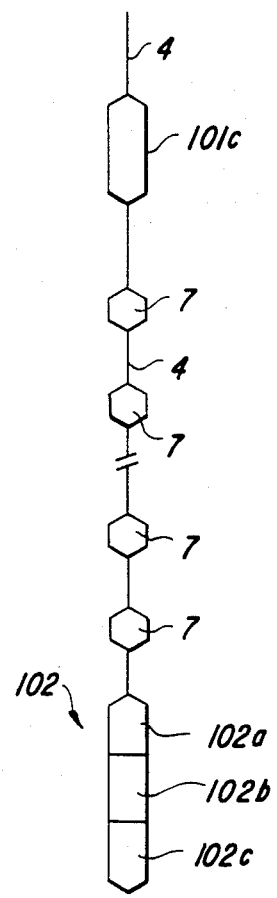

Two such examples are schematically shown in FIGS. 23 and 24. The apparatus combination shown in FIG. 23 is for a check shot survey and it includes a composite apparatus 100 comprising a sonic exploration apparatus 100a, density exploration apparatus 100b and downhole seismic array cartridge 100c and an array of downhole seismic exploration devices 7. The downhole seismic array cartridge 100c for the array of devices 7 contains various electronics for signal acquisition and telemetry. It is to be noted that a head nose may be placed on top of the sonic exploration apparatus 100a and similarly a bottom nose may be placed at the bottom of the downhole seismic array cartridge 100c as is well known to one skilled in the art. In this configuration, it can carry out sonic, density and seismic arrival time measurements all at the same time. Seismic arrival time would be used to correct sonic logs in real time. The two downhole seismic exploration devices 7 spaced apart from each other over a fixed distance by the cable 4 can be used to measure delta T, which is the time for the seismic wave to travel from one exploration device to the next exploration device, accurately.

On the other hand, another apparatus combination shown in FIG. 24 is for three dimensional vertical seismic profiling (VSP) which is a technique of recording simultaneously the upgoing and downgoing wavetrains as well known in the art. In a deviated well exploration or in an offset VSP, it is very useful to know from which direction a seismic signal comes. Gimbal mount of geophones is commonly used, but the gimbal mount tends to be complicated in structure and low in reliability, and, moreover, it requires a large installation space which then makes the entire apparatus large in size and heavy in weight. As an alternative, a combination of a downhole seismic array with a gyroscope navigator apparatus, a casing collar locater and a gamma ray apparatus can provide three dimensional information as to the apparatus orientation. Gyroscope navigator apparatus, casing collar locater and gamma ray apparatus are all well known in the art wherein the gyroscope navigator apparatus is to survey the configuration of the borehole and a combination of casing collar locater and gamma ray apparatus is used to find the location of the apparatus relative to the underground formations. Based on this concept, the apparatus combination shown in FIG. 24 includes the downhole seismic array cartridge 101c, an array of seismic exploration devices 7 and a composite apparatus 102 comprising gyroscope navigator apparatus 102a, casing collar apparatus 102b and gamma ray apparatus 102c. The composite apparatus 102 is provided at the bottom end of the cable 4 so that it also serves as a weight to assist the downward movement of the entire apparatus combination along the borehole. With this structure, the casing collar locater and gamma ray apparatus correlate the depth scale relative to casing collars and the formation. Since the configuration of the borehole can be obtained from gyroscope navigator apparatus logs with information as to the inclination of seismic exploration devices 7, the three dimensional motion of seismic wave propagation can be decomposed into Cartesian coordinates, one vertical and two horizontal, for all levels of the apparatus.

As described in detail above, in accordance with the present invention, there is provided a downhole seismic exploration device capable of carrying out geophysical exploration at high accuracy. Since the present device can be made small in size and light in weight, it can be incorporated in an array having a plurality of devices. In this case, seismic measurements can be carried out at multiple depths at the same time using the same seismic source, which significantly contributes to reduce the time required for measurements and enhances reliability and accuracy in measurement. Moreover, when use is made of a magnetic clamper for temporarily clamping the device to the casing of the borehole, the overall structure of the seismic exploration device can be made more compact in size. Besides, in the case where the seismic exploration device is designed to have a two-part structure of carrier and sensor package, it can be so structured that only the sensor package is clamped to the casing of the borehole so that the accuracy of seismic measurement can be further enhanced. In the preferred embodiment, the magnetic clamper is provided in the sensor package. In the two-part structure, with the provision of a damper between the carrier and the sensor package, the sensor package can be acoustically decoupled from the carrier and downhole cable so that any undesired vibration can be prevented from being transmitted to the sensor package which contains various detectors, such as seismic detectors, thereby allowing measurements at high S/N ratio. Besides, with the provision of the conduit passage in the carrier, when included in an array, each of the seismic exploration devices in the array can be electrically connected in parallel to the host unit, and thus a local failure would not result in total failure.

There has been described and illustrated herein a device and apparatus in accordance with the present invention for downhole seismic exploration. While particular embodiments of the invention have been described, it is not intended that the invention be limited thereby. Therefore it will be apparent to those skilled in the art that various changes and modifications may be made to the invention as described without departing from the spirit and scope of the appended claims.

We claim:

1. A device for use in geophysical exploration of earth formations traversed by a borehole, comprising:
   sensor means having detecting means for detecting seismic acoustic data and having magnetic clamping means for clamping said sensor means to a wall of a borehole;
   carrier means for carrying said sensor means disposed in an internal space defined by a front end block, a rear end block spaced from said front end block and a pair of side blocks extending in parallel between said front and rear end blocks, said front end block being adapted for connection to a first point of a cable and said rear block being adapted for connection to a second point of said cable, and at least one of said pair of side blocks being formed with a conduit passage for receiving conductors of said cable; and
   damping means, interposed between said sensor means and said carrier means, for reducing transmission of vibration between the carrier means and said sensor means when said sensor means is clamped to the wall of the borehole.

2. A device for use in geophysical exploration of earth formations traversed by a borehole, comprising:
   sensor means having detecting means for detecting seismic acoustic data and having magnetic clamping means for clamping said sensor means to a wall of a borehole, said magnetic clamping means including a rotatably supported permanent magnet having a pair of radially arranged N and S poles for generating magnetic flux and magnetic flux path changing means for changing the path of magnetic flux generated by said permanent magnet between an OFF condition in which said magnetic flux follows a path within said clamping means and an ON condition in which said magnetic flux follows a path extending outside said clamping means to clamp said sensor means by magnetic attraction;
   carrier means for carrying said sensor means and adapted for connection to a cable; and
   damping means, interposed between said sensor means and said carrier means, for reducing transmission of vibration between the carrier means and said sensor means when said sensor means is clamped to the wall of the borehole.

3. The device of claim 2 wherein said magnetic flux path changing means comprises a motor for rotating said magnet, a pair of clamping plates arranged in parallel on both sides of said magnet and comprising a magnetically permeable material, and a pair of separators arranged on both sides of said magnet and sandwiched between said clamping plates and comprising a magnetically non-permeable material.

4. The device of claim 3 wherein each said clamping plate has a pair of mating surfaces on opposite sides profiled for contact with an interior surface of a borehole casing.

5. The device of claim 3 further including automatic shut-off means to shut off said motor when said magnet has rotated through a predetermined angle.

6. The device of claim 5 wherein said automatic shut-off means comprises a pair of reed switches disposed perpendicularly to each other adjacent said magnet.

7. A device for use in geophysical exploration of earth formations traversed by a borehole, comprising:
   sensor means having detecting means for detecting desired geophysical data, clamping means including a rotatably supported permanent magnet having a pair of radially arranged N and S poles for generating magnetic flux, and magnetic flux path changing means for changing the path of magnetic flux generated by said permanent magnet between an OFF condition in which the magnetic flux follows a path within said clamping means and an ON condition in which the magnetic flux follows a path extending outside said clamping means to clamp said sensor means by magnetic attraction.

8. The device of claim 7 wherein said magnetic flux path changing means comprises a motor for rotating said magnet, a pair of clamping plates arranged in parallel on both sides of said magnet and comprising a magnetically permeable material, and a pair of separators arranged on both sides of said magnet and sandwiched between said clamping plates and comprising a magnetically non-permeable material.

9. The device of claim 8 wherein each said clamping plate has a pair of mating surfaces on opposite sides profiled for contact with an interior surface of a borehole casing.

10. The device of claim 8 further including automatic shut-off means to shutoff said motor when said magnet has rotated through a predetermined angle.

11. The device of claim 10 wherein said automatic shut-off means comprises a pair of reed switches disposed perpendicularly to each other adjacent said magnet.

12. A device for use in geophysical exploration of earth formations traversed by a borehole, comprising:

sensor means having detecting means for detecting seismic acoustic data and having magnetic clamping means for clamping said sensor means to a wall of a borehole;

carrier means for carrying said sensor means and adapted for connection to a cable;

damping means interposed between said sensor means and said carrier means for reducing transmission of vibration between the carrier means and said sensor means when said sensor means is clamped to the wall of the borehole; and piezo shaker means for vibrating said sensor means.

13. The device of claim 12 wherein said piezo shaker means is a bimorph element.

* * * * *